H. B. TAYLOR.
ELECTRICAL MEASURING INSTRUMENT.
APPLICATION FILED NOV. 6, 1914.

1,236,786.

Patented Aug. 14, 1917.

WITNESSES:

INVENTOR
Harold B. Taylor.
BY
ATTORNEY

UNITED STATES PATENT OFFICE.

HAROLD B. TAYLOR, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,236,786.  Specification of Letters Patent.  Patented Aug. 14, 1917.

Application filed November 6, 1914. Serial No. 870,590.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and it has particular reference to ammeters.

The object of my invention is to provide an ammeter for direct current electrical circuits that shall indicate correctly the value of the current traversing the circuit without the necessity of interrupting its continuity.

Figure 1:
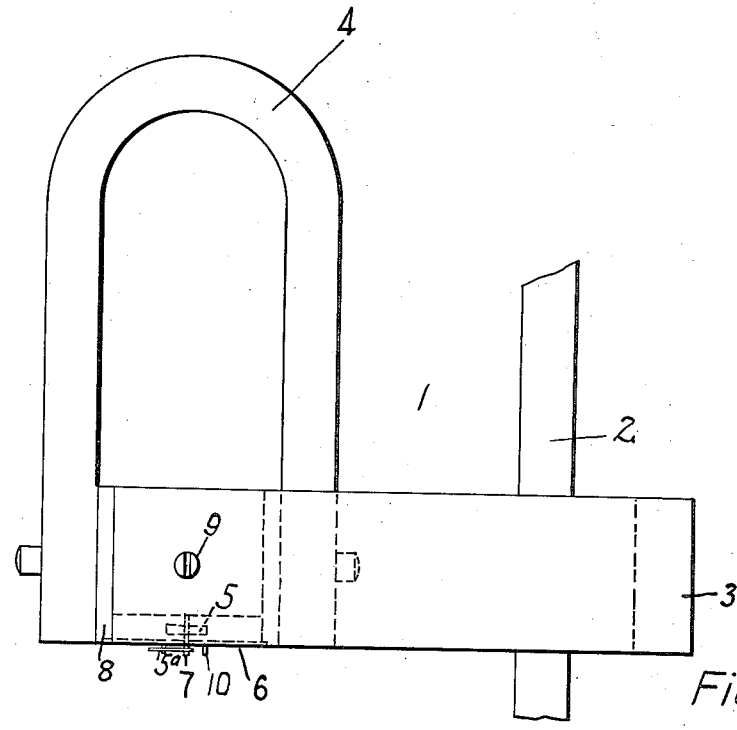
Figure 2:
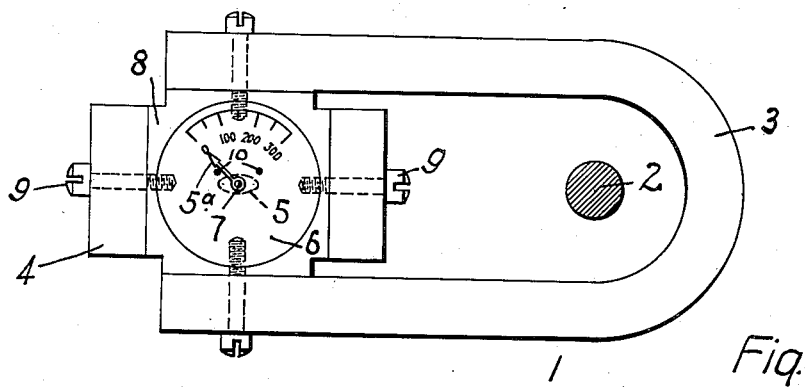

In the accompanying drawings, Figure 1 is a side elevational view of an electrical measuring instrument embodying my invention and Fig. 2 is a top view, partially in plan and partially in section, of the instrument shown in Fig. 1.

An electrical measuring instrument 1 is provided for measuring the current traversing a conductor 2 of an electrical circuit, and comprises a detachable stationary magnetizable member 3 that is adapted to surround the conductor 2, a permanent magnet 4 that is disposed at right angles to the magnetizable member 3, a movable armature 5, preferably made of soft iron, a pointer 5ª and a scale 6 for coöperating with the pointer 5ª to indicate the value of the current traversing the conductor 2. The armature 5 is pivoted on a pin 7 that is mounted on a positioning member 8. It will be seen from the drawing that the member 8 is disposed between the respective poles of the permanent magnet 4 and the magnetizable member 3 and is secured thereto by a plurality of screws 9. Two pins or stops 10 are provided to prevent the overtravel of the armature, and thus the reversal and the stopping of the same on a dead point.

When no current traverses the conductor 2 the armature 5 will be held in its initial position by the magnetic lines of force from the permanent magnet 4. However, when current traverses conductor 2, two magnetic fields will act on the armature 5 to cause the same to move to a position in which the resultant field produced thereby has maximum strength. Thus, when current traverses the conductor 2 to magnetize the member 3, the armature 5 will assume a position that indicates the value of the current to be measured, and, when the current ceases to flow, the armature 5 will return to its initial position, as hereinbefore set forth.

By suitably proportioning the magnetizable member 3, the permanent magnet 4 and by providing specially shaped pole pieces therefor, the direction of the resultant field corresponding to the various currents in the conductor 2 may be varied so as to control the spacing of the divisions on the scale 6.

It will be understood that my invention is not limited to the particular construction illustrated, but is capable of various modifications within the scope of the appended claims.

I claim as my invention:

1. An electrical measuring instrument comprising a detachable magnetizable member adapted to be disposed around a conductor the current traversing which is to be determined, a stationary permanent magnet disposed substantially at right angles to the said magnetizable member, and a pivoted armature adapted to be influenced by the magnetic lines of force from the said stationary permanent magnet and the said magnetizable member.

2. A measuring instrument for an electric circuit comprising a stationary magnetizable member adapted to be disposed around one conductor of the electric circuit, a stationary permanent magnet disposed substantially at right angles to the said magnetizable member, and a movable member disposed in the magnetic field of the said permanent magnet and the said magnetizable member.

3. An electrical measuring instrument comprising a magnetizable member of substantially U-shape adapted to surround a conductor the current traversing which is to be measured, a stationary permanent magnet, and a movable member disposed in the magnetic field of the said permanent magnet and the said magnetizable member.

4. A measuring instrument for an electric circuit comprising a stationary magnetizable member adapted to be disposed around one conductor of the electric circuit, a movable magnetizable member adapted to be actuated by the magnetic lines of force of the said magnetizable member, and a magnetic controlling means for returning the said movable magnetizable member to its initial position under predetermined conditions.

5. An electrical measuring instrument comprising a magnetizable member of substantially U-shape, a permanent magnet of substantially U-shape, a positioning member so operatively secured to the respective poles of the permanent magnet and the magnetizable member as to cause their fluxes to be substantially at right angles to each other, and a rotatable member mounted on the positioning member, the said magnetizable member being adapted to surround a conductor the current traversing which is to be measured.

6. An electrical measuring instrument comprising a magnetizable member adapted to surround a conductor the current traversing which is to be measured, a permanent magnet, and a movable member adapted to be actuated by a force that is the resultant of the magnetic forces of the permanent magnet and the said magnetizable member.

7. An electrical measuring instrument comprising a stationary magnetizable member of substantially U-shape adapted to surround a conductor and to be magnetized in accordance with the current traversing the conductor, a permanent magnet, and a movable magnetizable member adapted to be actuated by a force that is the resultant of the magnetic forces of the said permanent magnet and the said magnetizable member.

8. A measuring instrument for an electric circuit comprising a magnetizable member adapted to be disposed around one conductor of the electric circuit, a permanent magnet, and a pivoted armature adapted to be actuated by the resultant fluxes of the permanent magnet and the magnetizable member.

In testimony whereof, I have hereunto subscribed my name this 29th day of Oct. 1914.

HAROLD B. TAYLOR.

Witnesses:
A. L. ATHERTON,
B. B. HINES.